US008098331B2

(12) United States Patent
Miyazawa

(10) Patent No.: US 8,098,331 B2
(45) Date of Patent: Jan. 17, 2012

(54) VIDEO-DATA PROCESSING APPARATUS FOR ACHIEVING EDGE-SMOOTHING AND METHOD OF PROCESSING VIDEO DATA

(75) Inventor: Hirotoshi Miyazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1238 days.

(21) Appl. No.: 11/819,390

(22) Filed: Jun. 27, 2007

(65) Prior Publication Data
US 2008/0002061 A1  Jan. 3, 2008

(30) Foreign Application Priority Data

Jun. 30, 2006  (JP) ................................. 2006-182194

(51) Int. Cl.
*H04N 9/74* (2006.01)
*H04N 1/40* (2006.01)
*H04N 1/38* (2006.01)
*G09G 5/00* (2006.01)
*G06K 9/36* (2006.01)
*G06K 9/40* (2006.01)
*G06K 9/46* (2006.01)

(52) U.S. Cl. ........ 348/584; 345/625; 382/233; 382/254; 382/261; 382/266; 382/275; 358/447; 358/463

(58) Field of Classification Search .................. None
See application file for complete search history.

(56) References Cited

U.S. PATENT DOCUMENTS

| 5,454,052 | A | * | 9/1995 | Kojima | 382/233 |
| 5,799,111 | A | * | 8/1998 | Guissin | 382/254 |
| 2005/0008251 | A1 | * | 1/2005 | Chiang | 382/266 |

FOREIGN PATENT DOCUMENTS

| JP | 05-304620 | 11/1993 |
| JP | 08-340494 | 12/1996 |
| JP | 11-196294 | 7/1999 |
| JP | 2000-341558 | 12/2000 |
| JP | 2001-285673 | 10/2001 |
| JP | 2002-158895 | 5/2002 |
| JP | 2003-244481 | 8/2003 |
| JP | 2005-142680 | 6/2005 |

OTHER PUBLICATIONS

Japanese Office Action dated Mar. 22, 2011.

* cited by examiner

*Primary Examiner* — Jefferey Harold
*Assistant Examiner* — Sean Haiem
(74) *Attorney, Agent, or Firm* — Pillsbury Winthrop Shaw Pittman, LLP

(57) ABSTRACT

According to one embodiment, an edge-smoothing apparatus has a synthesizing unit that generates a main synthesized video signal representing different images, a flag-inserting unit that inserts ID flags into the video data items, respectively, an image-edge processing unit that outputs a reference synthesized video signal from the main synthesized video signal, and selects and outputs a plurality of edge-smoothing synthesized video signals in accordance with a selection signal. A flag decoder discriminates the ID flags and generates the selection signal to prevent the edge-smoothing synthesized video signals for the different images, from being processed together, and generates an edge-smoothing-parameter selecting signal in accordance with the ID flags. Edge-smoothing components are generated by using the reference synthesized video signal from the image-edge processing unit and the edge-smoothing synthesized video signals. The edge-smoothing components, thus generated, are adjusted with a parameter selected.

6 Claims, 8 Drawing Sheets

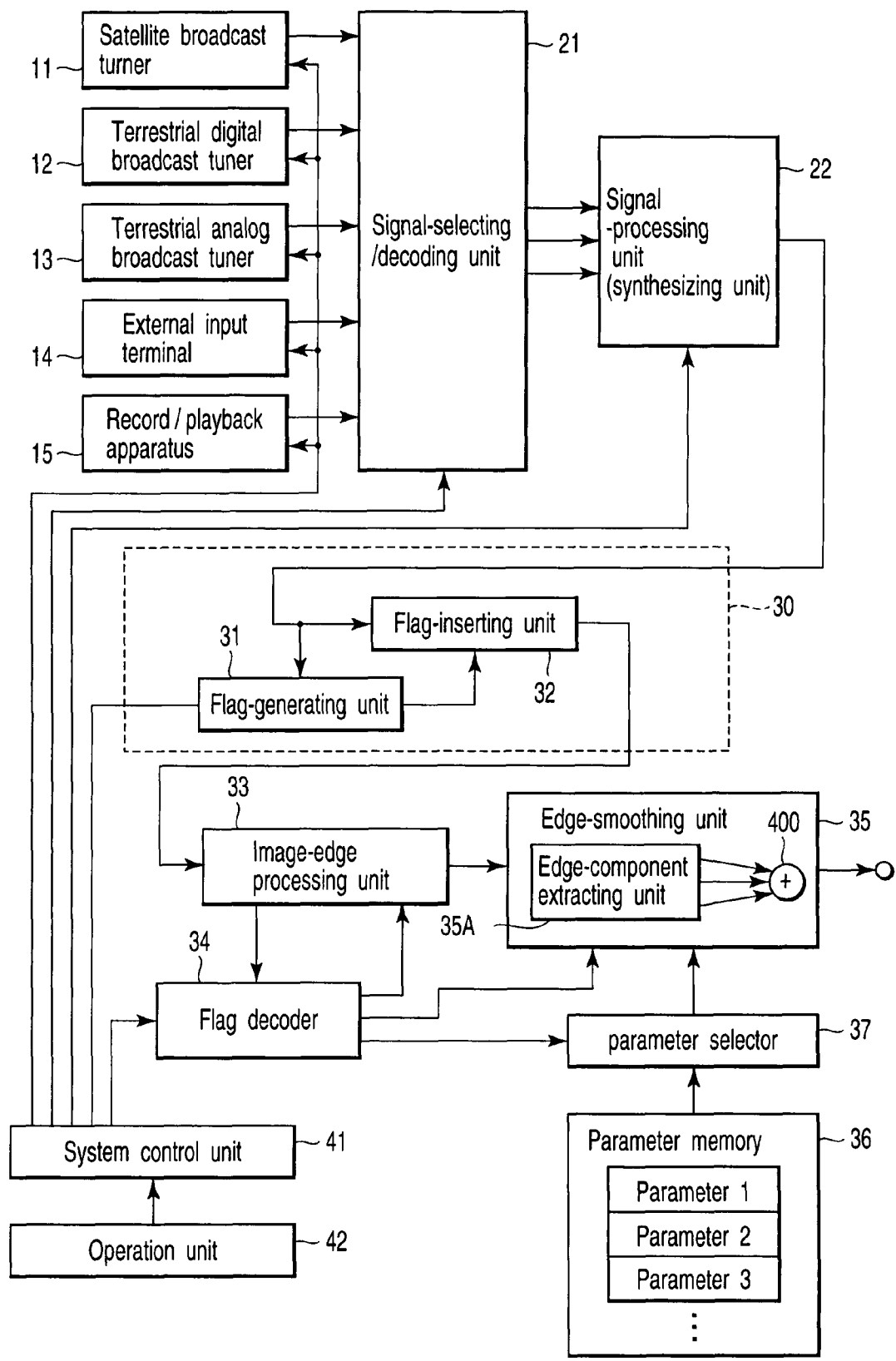
F I G. 1

VIDEO-DATA PROCESSING APPARATUS FOR ACHIEVING EDGE-SMOOTHING AND METHOD OF PROCESSING VIDEO DATA

CROSS-REFERENCE TO RELATED APPLICATIONS

This application is based upon and claims the benefit of priority from Japanese Patent Application No. 2006-182194, filed Jun. 30, 2006, the entire contents of which are incorporated herein by reference.

BACKGROUND

1. Field

One embodiment of the invention relates to a video-data processing apparatus for achieving edge adjustment, which is simple in configuration, and a method of processing video data.

2. Description of the Related Art

Video-data processing apparatuses have an edge-smoothing unit. To perform edge smoothing on different types of video data items, various edge-smoothing modes are set for the types of video data items, respectively (see, for example, Jpn. Pat. Appln. KOKAI Publication No. 2003-244481). That is, a band-division filter bank is used to process video data items of different types. In other words, a plurality of band-pass filters are used to determine the frequency distributions for the bands of input video data. Video data items of different types are thereby discriminated, and edge components extracted on the basis of the result of the discrimination. Thus, the edge components can be extracted in accordance with the type of the video data items. Edge components can therefore be extracted in accordance with the type of each video data item.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is a block diagram showing an embodiment of the present invention;

DETAILED DESCRIPTION

Figure 2:
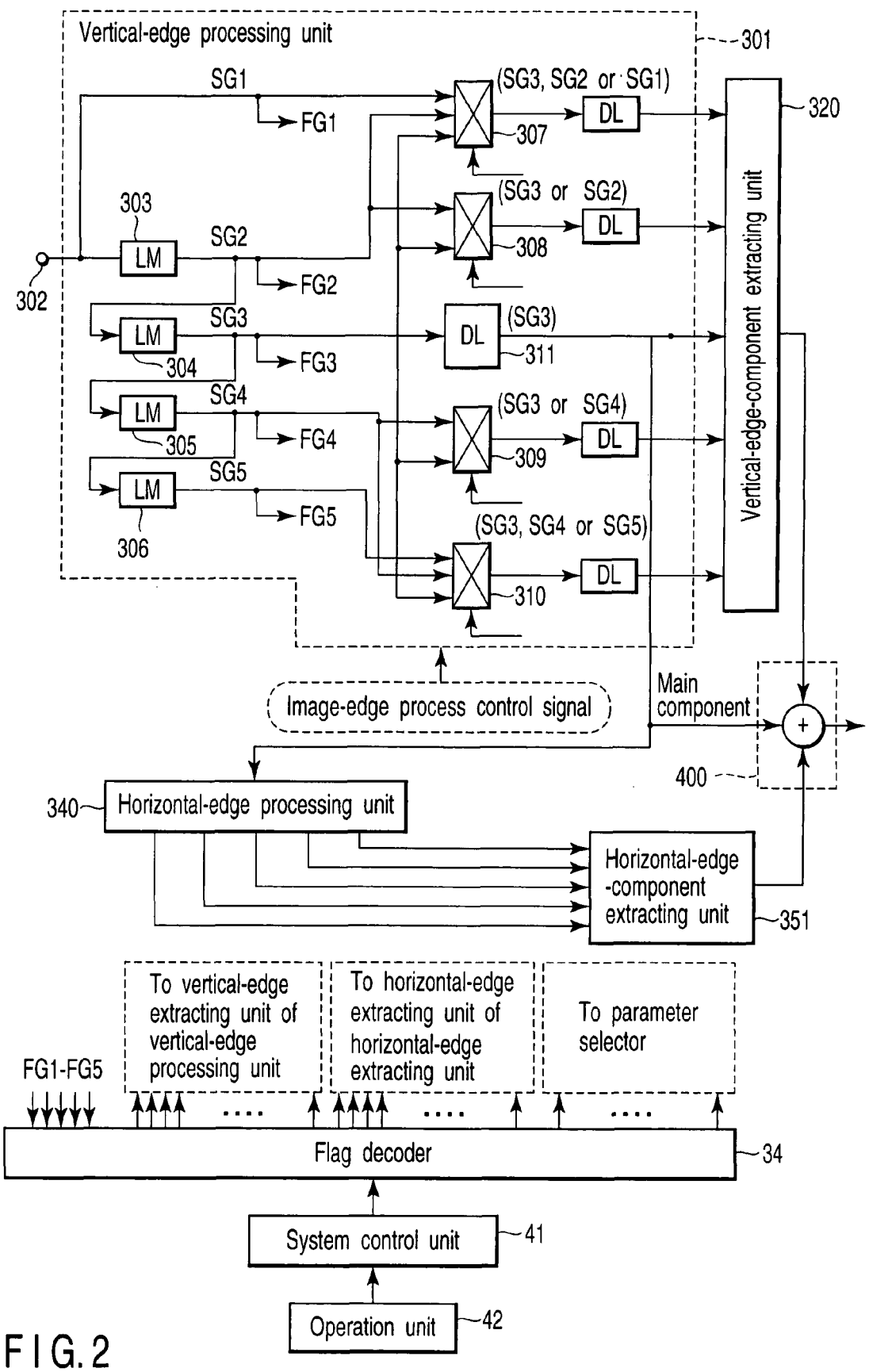
FIG. 2 is a diagram showing an exemplary configuration of the video-data processing unit shown in FIG. 1.

Various embodiments according to the invention will be described hereinafter with reference to the accompanying drawings. FIG. 1 shows a television receiver to which this invention is applied. The television receiver comprises, for example, a satellite broadcast tuner 11, a terrestrial digital broadcast tuner 12, a terrestrial analog broadcast tuner 13 and the like, and can therefore receive broadcast signals of various types. The television receiver has an external input terminal 14, too. Further, it has an input unit for receiving signals form a record/playback apparatus 15. It also has a signal-selecting/decoding unit 21, which selects signals from the tuners 11, 12 and 13 and external input terminal 14. The selection/decoding unit 21 selects signals output from the tuners and input terminal 14. Any signal selected by the unit 21 is input to a signal-processing unit 22.

The signal-processing unit 22 includes a signal-synthesizing unit and can synthesize video signals of different types to generate video data for one screen, as it is controlled by a control signal supplied from a system control unit 41. The signal-processing unit 22 includes an image-reducing unit and an image-magnifying unit and can, therefore, reduce and magnify the image represented by any signal designated. The video signal that the signal-processing unit 22 has generated by synthesizing video signals supplied from different sources will be referred to as main synthesized video signal.

The main synthesized signal is input to a flag-inserting unit 30. The flag-inserting unit 30 inserts flags into the signal, so that the video data may be identified with respect to, for example, each pixel data item. The configuration of the main synthesized signal, i.e., the arrangement of video signals representing different images is managed by the system control unit 41. That is, the system control unit 41 controls a flag-generating unit 31 included in the flag-inserting unit 30, causing the unit 31 to generate, for example, ID flags identifying video signals, such as flag 1, flag 2 and flag 3, as the pixel data items contained in the video signals representing different images are input to the flag-inserting unit 30. A flag-inserting unit 32 included in the flag-inserting unit 30 sets an extension area for the pixel data items and inserts the ID flags into the extension area.

As a result, each pixel data item contained in the main synthesized video data output from the flag-inserting unit 30 includes an ID flag that identifies the video signal representing a different image. The main synthesized video signal is input to an image-edge processing unit 33. The image-edge processing unit 33 includes a plurality of delay circuits and outputs a reference synthesized video signal that is used as reference on the time axis as will be describe later. The unit 33 also selects and outputs the edge-smoothing synthesized signals that precedes and follows in phase the reference synthesized video signal, respectively, in accordance with an image-edge process control signal.

The image-edge process control signal is output from a flag decoder 34, which has detected and decoded the ID flag. The image-edge process control signal is important in generating a plurality of edge-smoothing synthesized signals. That is, the flag decoder 34 detects the ID flag of the main synthesized video signal and generates an image-edge process control signal to prevent the synthesized video signals for smoothing the edges of the different images represented by video data items from being processed altogether. At the same time, the flag decoder 34 generates edge-smoothing-parameter selection signal in accordance with the ID flag.

The reference synthesized video signal and the edge-smoothing synthesized signals, all output from the image-edge processing unit 33, are input to, and processed by, an edge-smoothing unit 35. The edge-smoothing unit 35 has an edge-component extracting unit 35A and an adder 400. The edge-component extracting unit 35A generates edge-smoothing components and adjusts the edge-correcting components in accordance with the parameters selected by an edge-smoothing-parameter selection signal supplied from the flag decoder 34. The edge-correcting components thus adjusted are multiplexed with the reference synthesized video signal.

The various parameters mentioned above are stored in a parameter memory 36. A parameter selector 37 selects appropriate parameters, which are input to the edge-smoothing unit 35. The parameter selector 37 selects parameters in accordance with the edge-smoothing-parameter selection signal supplied from the flag decoder 34.

Assume that the synthesized video signal has a synthesized area including characters and subtitles. Then, the characters can be edge-smoothed if the vertical- and horizontal-high-band components are emphasized. In this case, it is better that the edge-smoothing components be generated from the pixels that lie adjacent the reference pixel (for example, two pixels immediately above and below the reference pixel and two pixels immediately on the left and right of the reference pixel), and the amplifier for amplifying the edge-smoothing components should have a high gain.

Assume that the synthesized video signal has an area showing a person's portrait. Then, the synthesized video signal has no high-band components because the signal has been subjected to an image-magnifying process. In this case, it is better that the edge-smoothing components be generated from the pixels that lie remote from the reference pixel (for example, two pixels vertically spaced by two-line distance from the reference pixel and two pixels horizontally spaced by two-pixel distance from reference pixel), and the amplifier for amplifying the edge-smoothing components should have a low gain.

To extract the edge components as described above, the filter used must have its characteristic switched to a desired one. The signal for switching the filter characteristic is output from the flag decoder 34 or the system control unit 41 in accordance with what kind of area the synthesized video signal has (or, what kind of image the signal represents).

An operation unit 42 includes a remote controller. The user may operate the operation unit 42 in order to, for example, synthesize images. Images can be synthesized by various methods. For example, several sample patterns of synthesizing a plurality of images may be preset and the user may select one of the sample patterns. Otherwise, a navigation menu may be displayed, which shows, for example, the mode of dividing an image into left part and right halves, the mode of dividing an image into upper and lower halves, and the mode of setting a number of parts into which an image is to be divided. The user may operate the operation unit 42 to adjust images, for example, emphasizing or deemphasizing the edges of any image. In this case, the mode of selecting parameters is switched.

FIG. 2 shows the configuration of the image-edge processing unit 33 in detail, particularly the vertical-edge processing unit 301 incorporated in the image-edge processing unit 33. A synthesized video signal is input to the input terminal 302 of the vertical-edge processing unit 301. In the vertical-edge processing unit 301, the synthesized video signal is input to a line selector 310 via line memories 303, 304, 305 and 306 that are connected in series. The synthesized video signal is input to a line selector 307, too.

The line selector 307 receives the video signals output from the line memories 303 and 304. The line selector 308 receives the video signals output from the line memories 303 and 304. The line selector 309 receives the video signals output from the line memories 304 and 305. The line selector 310 receives the video signals output from the line memories 304, 305 and 306.

The line selectors 307, 308, 309 and 310 select and outputs one of the input signals in accordance with an image-edge process control signal supplied from the flag decoder 34. The signals output from the line selectors 307, 308, 309 and 310 are input via delay circuits to a vertical-edge-component extracting unit 320. The signal output from the line memory 304 is input via a delay circuit 311 to the vertical-edge-component extracting unit 320.

The video signal output from the line memory 304 is used as reference synthesized video signal. The video signals output from the line selectors 307, 308, 309 and 310 are used as edge-smoothing synthesized video signals (for horizontal lines above and below a center line) preceding and following in phase the reference synthesized video signal (for the center line).

The reference synthesized video signal is input to a horizontal-edge processing unit 340, too. The configuration of the horizontal-edge processing unit 340 will be described later. The horizontal-edge processing unit 340 outputs a reference synthesized video signal (i.e., a center pixel signal) and edge-smoothing synthesized video signals (left pixel signal and right pixel signal) that precedes and follows in phase the reference synthesized video signal, respectively. The edge-smoothing synthesized video signals and the reference synthesized video signal are input to a horizontal-edge-component extracting unit 351. The adder 400 mentioned above adds a vertical-edge-smoothing component and a horizontal-edge-smoothing component to the reference synthesized video signal, i.e., main component.

The line memory 303 receives an input video signal SG1 and outputs a video signal SG2. The line memory 304 outputs a video signal SG3. The line memory 305 outputs a video signal SG4. The line memory 306 outputs a video signal SG5. The video signals SG1 to SG5 represent pixel data items that contain ID flags FG1 to FG5, respectively.

The ID flags FG1 to FG5 are input to the flag decoder 34. The flag decoder 34 analyzes the ID flags FG1 to FG5, determining the boundaries between the different images that constitute the synthesized image. This prevent the video data items representing the different images from being mixed in the signals input from the vertical-edge processing unit 301 to the vertical-edge-component extracting unit 320.

Measures are taken not to mix video data items (pixels) representing different images in the video signals input from the horizontal-edge processing unit 340 to the horizontal-edge-component extracting unit 351. Therefore, the image-edge processing unit 33 never uses video data items representing different images to generate vertical-edge components and horizontal-edge components. Hence, the image-edge processing unit 33 generates accurate edge component.

Figure 3:
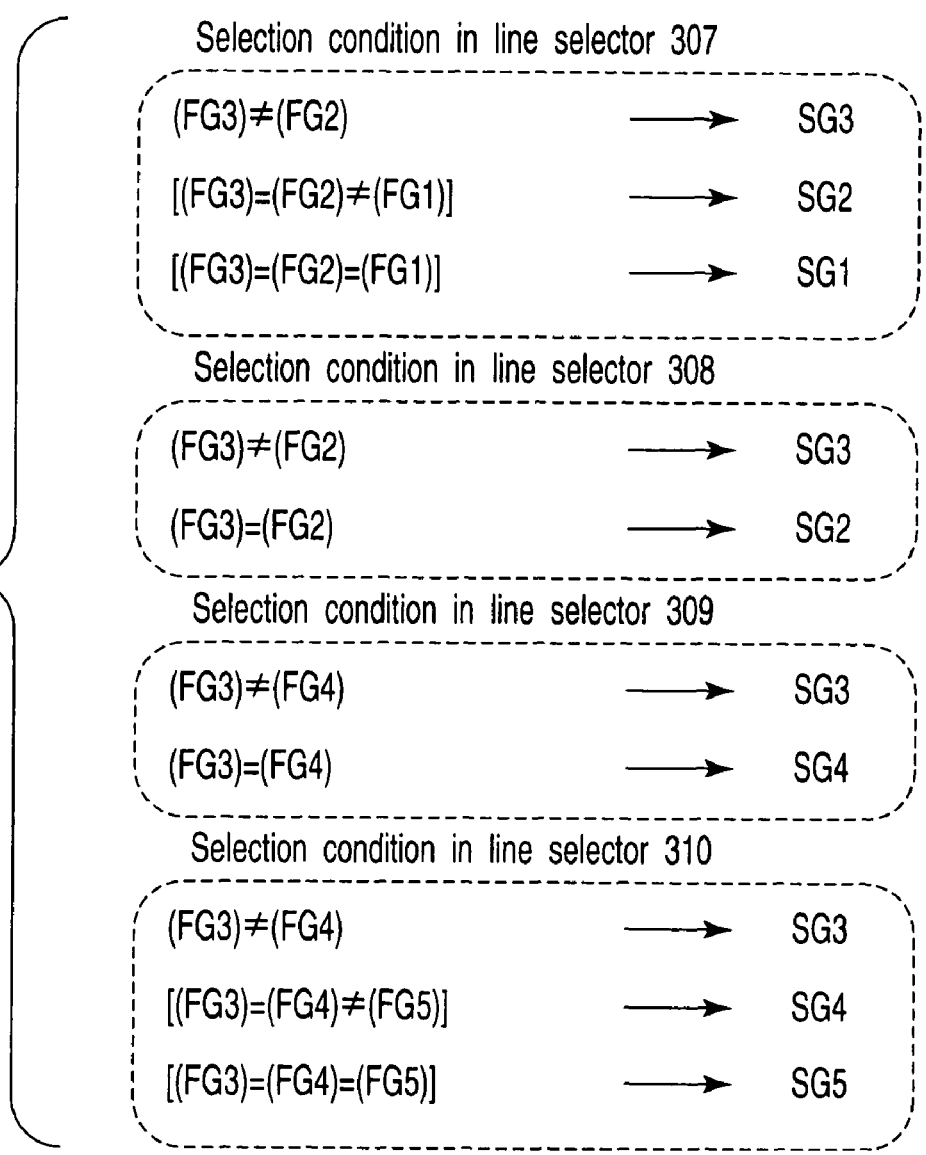
FIG. 3 is a diagram explaining the relation between the input-selecting conditions for the selectors 307 to 310 shown in FIG. 2 and the outputs thereof.

FIG. 3 shows the input-selecting conditions for the line selectors 307 to 310 shown in FIG. 2.

Assume that the flags FG3 and FG2 are not identical. This indicates that the video signals output from the line memories 303 and 304 represent different images. That is, a boundary exists between the images represented by the video signals output from the line memories 303 and 304. In this case:

The line selector 307 selects and outputs the video signal SG3.

The line selector 308 selects and outputs the video signal SG3.

The line selector 309 selects and outputs the video signal SG4 (because SG3 and SG4 represent images of the same source).

The line selector 310 selects and outputs the video signal SG5 (because SG3, SG4 and SG5 represent images of the same source).

Assume that the flags FG2 and FG1 are not identical. This indicates that the video signals input to and output from the line memory 303, respectively, represent different images. That is, a boundary exists between the images represented by the video signals input to and output from the line memory 303. In this case:

The line selector 307 selects and outputs the video signal SG2.

The line selector 308 selects and outputs the video signal SG2.

The line selector 309 selects and outputs the video signal SG4 (because SG3 and SG4 represent images of the same source).

The line selector 310 selects and outputs the video signal SG5 (because SG3, SG4 and SG5 represent images of the same source).

Assume that the flags FG3 and FG4 are not identical. This indicates that the video signals input to and output from the line memory 305, respectively, represent different images. That is, a boundary exists between the images represented by the video signals input to and output from the line memory 305. In this case:

The line selector 307 selects and outputs the video signal SG1 (because SG3, SG2 and SG1 represent images of the same source).

The line selector 308 selects and outputs the video signal SG2 (because SG3 and SG2 represent images of the same source).

The line selector sensor 309 selects and outputs the video signal SG3.

The line selector 310 selects and outputs the video signal SG3.

Assume that the flags FG4 and G5 are not identical. This indicates that the video signal output from the line memory 305 and the video signal output from the line memory 306 represent different images. That is, a boundary exists between the images represented by the video signals input to and output from the line memory 306. In this case:

The line selector 307 selects and outputs the video signal SG1 (because SG3, SG2 and SG1 represent images of the same source).

The line selector 308 selects and outputs the video signal SG2 (because SG3 and SG2 represent images of the same source).

The line selector 309 selects and outputs the video signal SG4.

The line selector 310 selects and outputs the video signal SG4.

Figure 4:
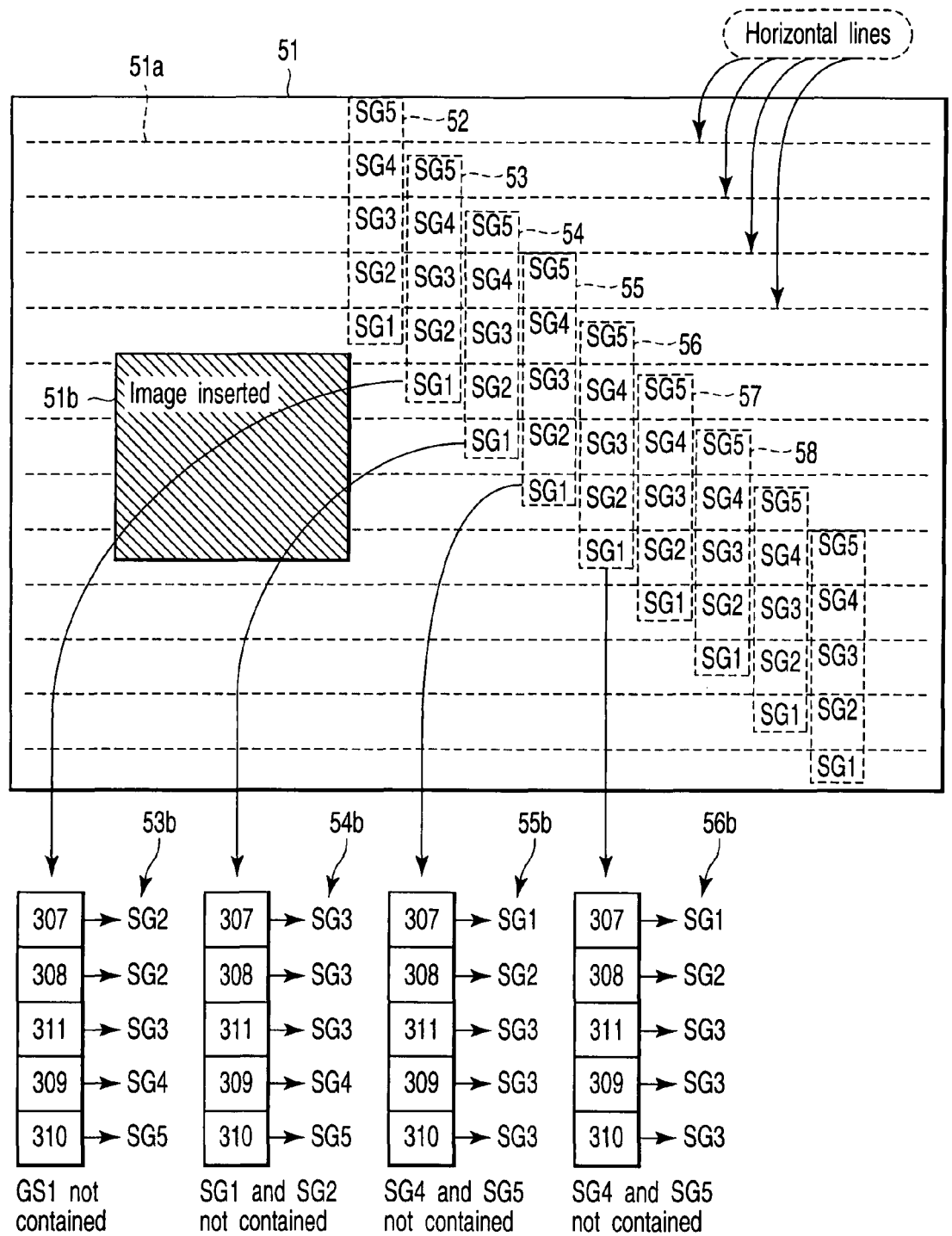
FIG. 4 is a diagram schematically explaining the operation of the circuits shown in FIG. 2.

FIG. 4 schematically shows the outputs the selectors have selected as described above, and the synthesized images displayed on a display 51. In FIG. 4, region 51a is for a first image, and region 51b is for a second image. Blocks 53a to 58a indicate how the video signals SG1 to SG5 input to, and output from, the line memories 303 to 306 change with time. Also shown in FIG. 4 are the output video signals 53b to 55b output from the line selectors 307 to 310, respectively, as the video signals SG1 to SG5 change with time. As seen from this schematic diagram, the video signals (line signals) representing the images in two areas are not mixed in the video signals output from the line selectors 307 to 310, at the time the video signals representing pixels near the boundary between the areas 51a and 51b. Therefore, any circuit that acquires edge-smoothing components by using the outputs of the line selectors 307 to 310 can extract appropriate edge components.

Figure 5:
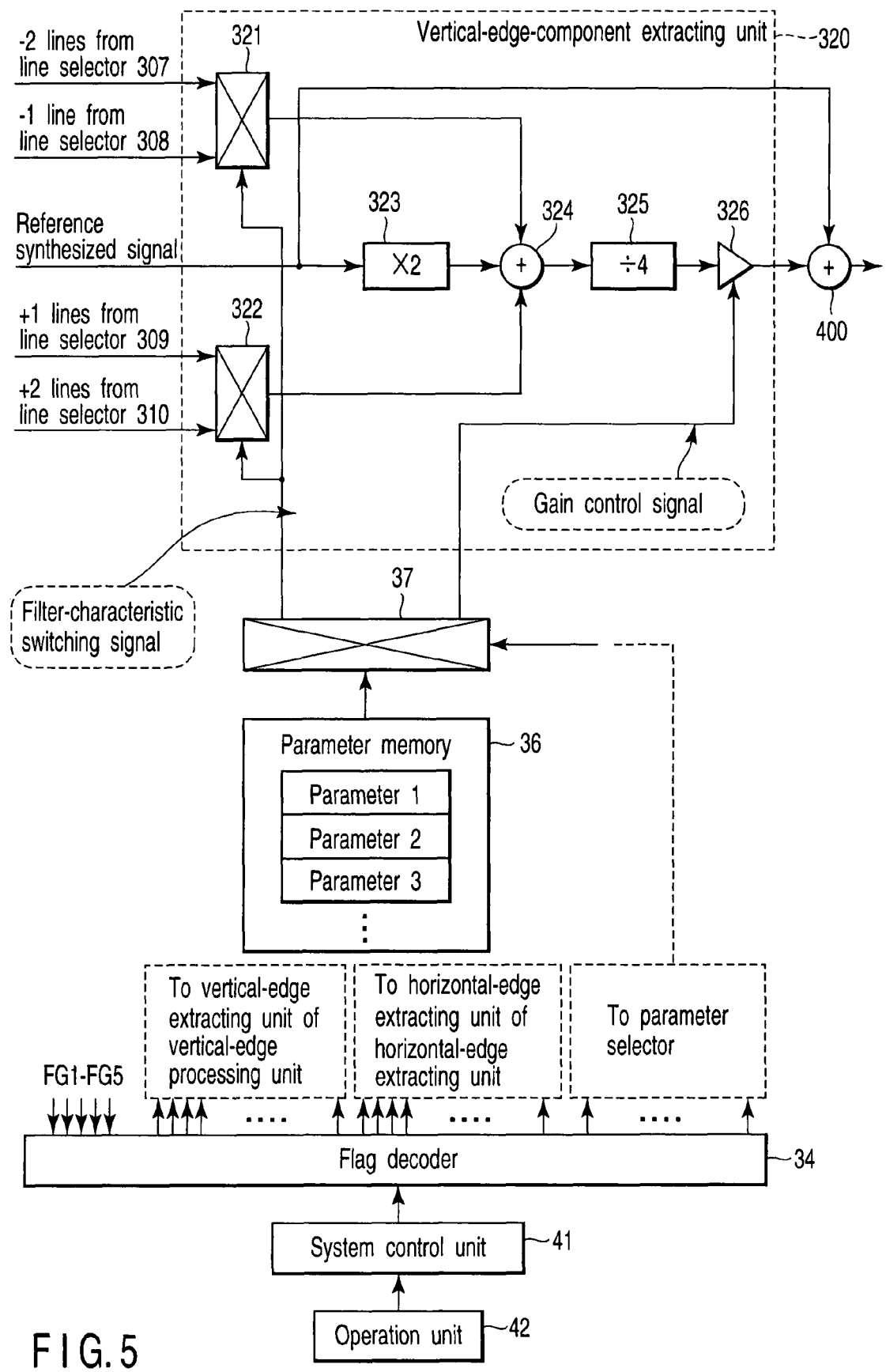
FIG. 5 is a diagram showing, in detail, an exemplary circuit configuration of the vertical-edge-component extracting unit shown in FIG. 2.

FIG. 5 shows, in detail, an exemplary circuit configuration of the vertical-edge-component extracting unit 320. In the unit 320, a two-times multiplier 323 receives a reference synthesized video signal. A line selector 321 receives the video signals output from the line selectors 307 and 308. A line selector 322 receives the video signals output from the line selectors 309 and 310. The signals selected by the line selectors 321 and 322 are input to a line adder 324. The line adder 324 adds these signals. The output of the line adder 324 is input to a ¼ line divider 325. The output of the line divider 325 is input to a line amplifier 326. The output of the line amplifier 326 is a vertical-edge-smoothing component.

A high-frequency edge component may need to be processed. In this case, the line selectors 321 and 322 select signals for two lines (i.e., −1 line and +1 line) preceding and following the horizontal line for the reference synthesized video signal, respectively. If the edge component is not a high vertical frequency component, the line selectors 321 and 322 select two lines (i.e., −2 line and +2 line) preceding and following, by two-line distance, the horizontal line for the reference synthesized video signal, respectively. The selection signal that makes the line selectors 321 and 322 select two lines are known as vertical-filter-characteristic switching signals. The selection signal is an output of the flag decoder 34. Alternatively, it is acquired from the parameter selector 37 that selects the parameters read from the parameter memory 36. The parameter selector 37 performs the selection in accordance with a control signal supplied from the flag decoder 34.

A parameter that increases or decreases the edge gain is also selected from the parameters stored in the parameter memory 36, as the flag decoder 34 controls the parameter selector 37. Further, the system control unit 41 supplies the flag decoder 34 with an adjustment signal for smoothing edges. That is, when the user operates the operation unit 42 to smooth the edges, the system control unit 41 interprets the adjustment data. The system control unit 41 then switches the parameter-selecting pattern, from one to another, on the basis of the adjustment data.

Figure 6:
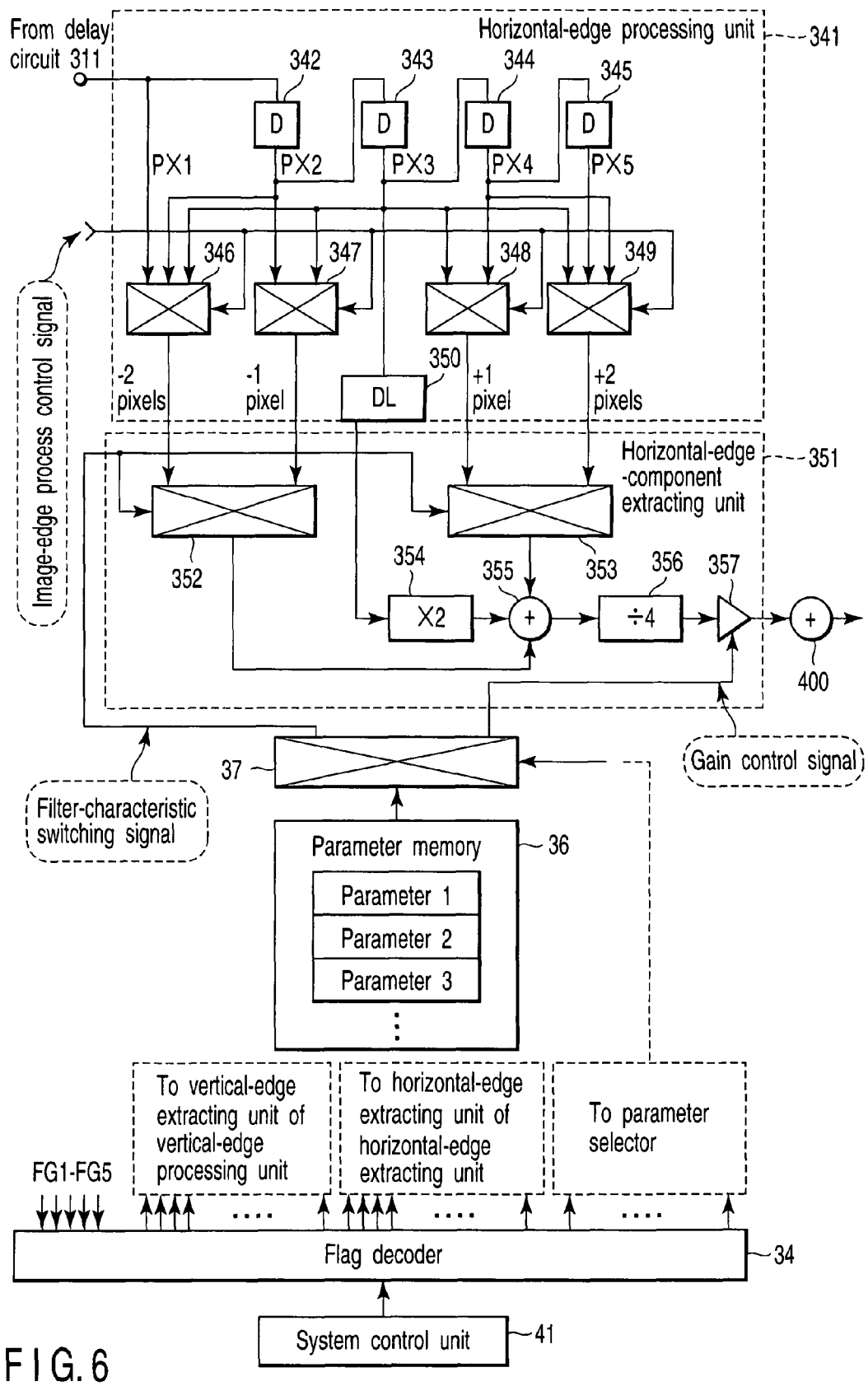
FIG. 6 is a diagram showing, in detail, exemplary configurations of the image-edge processing unit and the horizontal-edge processing unit and horizontal-edge-component extracting unit, both included in the edge-smoothing unit shown in FIG. 1.

FIG. 6 shows an exemplary configuration of a horizontal-edge processing unit 341. A video signal from the delay circuit 311 is input to a pixel selector 346 and a delay element 342 configured to delay a pixel unit. The delay element 342 is connected to delay elements 343, 344 and 345 in series. The delay elements 342 to 345 delay a one-pixel data each. Assume that a pixel Px1 is input to the horizontal-edge processing unit 341 and that the delay elements 342, 343, 344 and 345 outputs pixels Px2, Px3, Px4 and Px5, respectively. Then, the pixel selector 346 receives the input pixels Px1, Px2 and Px3, the pixel selector 347 receives the input pixels Px2 and Px3, the pixel selector 348 receives the input pixels Px3 and Px4, and the pixel selector 349 receives the input pixels Px3, Px4 and Px5.

The output of the delay element 343 is used as reference pixel signal and input through a delay circuit 350 to the two-times multiplier 354 provided in the horizontal-edge-component extracting unit 351. The outputs of the pixel selectors 346 and 347 are input to the pixel selector 352 provided in the horizontal-edge-component extracting unit 351. The outputs of the pixel selectors 348 and 349 are input to the pixel selector 353 provided in the horizontal-edge-component extracting unit 351.

The pixel signals selected by the pixel selectors 352 and 353 are input to a pixel adder 355. The output of the two-times multiplier 354 is input to the pixel adder 355, too.

The output of a pixel adder 355 is input to a ¼ pixel divider 356. The output (horizontal edge component) of the ¼ pixel divider 356 is input to a pixel amplifier 357, which controls the gain of the horizontal edge component. The horizontal edge component thus adjusted is input to the adder 400. The adder 400 adds a vertical-edge-smoothing component and a horizontal-edge-smoothing component to the main synthesized video signal as explained above. The pixel selectors 346 to 349 select and output one of the input video signals each. In this case, an edge-smoothing control signal is supplied from the flag decoder 34. Thus, the pixels pertaining to the different areas of an image will not mix at all. The control signals for the pixel selectors 352 and 353 are supplied from the parameter selector 37.

If edge components of high horizontal frequency must be processed, the pixel selectors 352 and 353 will select two pixel signals that exit, respectively, immediately on the left and right of the center pixel represented by the reference synthesized video signal. If no edge components have high horizontal frequencies, the pixel selectors 352 and 353 will select two pixel signals that exit, respectively, on the left and right of, and at two-pixel distance (+2 pixel distance and −2 pixel distance) from, the center pixel represented by the reference synthesized video signal. A selection signal that makes the pixel selectors 352 and 353 select these pixel signals is called horizontal-frequency-characteristic switching signal and has been acquired from the flag decoder 34 or the parameter selector 37 that selects one of the parameters stored in the parameter memory 36. The parameter selector 37 selects one parameter in accordance with a control signal supplied from the flag decoder 34.

The parameter that increases or controls the gain of any edge component is selected and output from the parameter memory 36, under the control of the flag decoder 34. An edge-smoothing signal is input to the flag decoder 34 from the system control unit 41. That is, when the user operates the operation unit 42 to smooth the edges, the system control unit 41 interprets adjustment data. In accordance with the adjustment data, the system control unit 41 then switches the parameter-selecting pattern to one in which the flag decoder 34 selects parameters.

Figure 7:
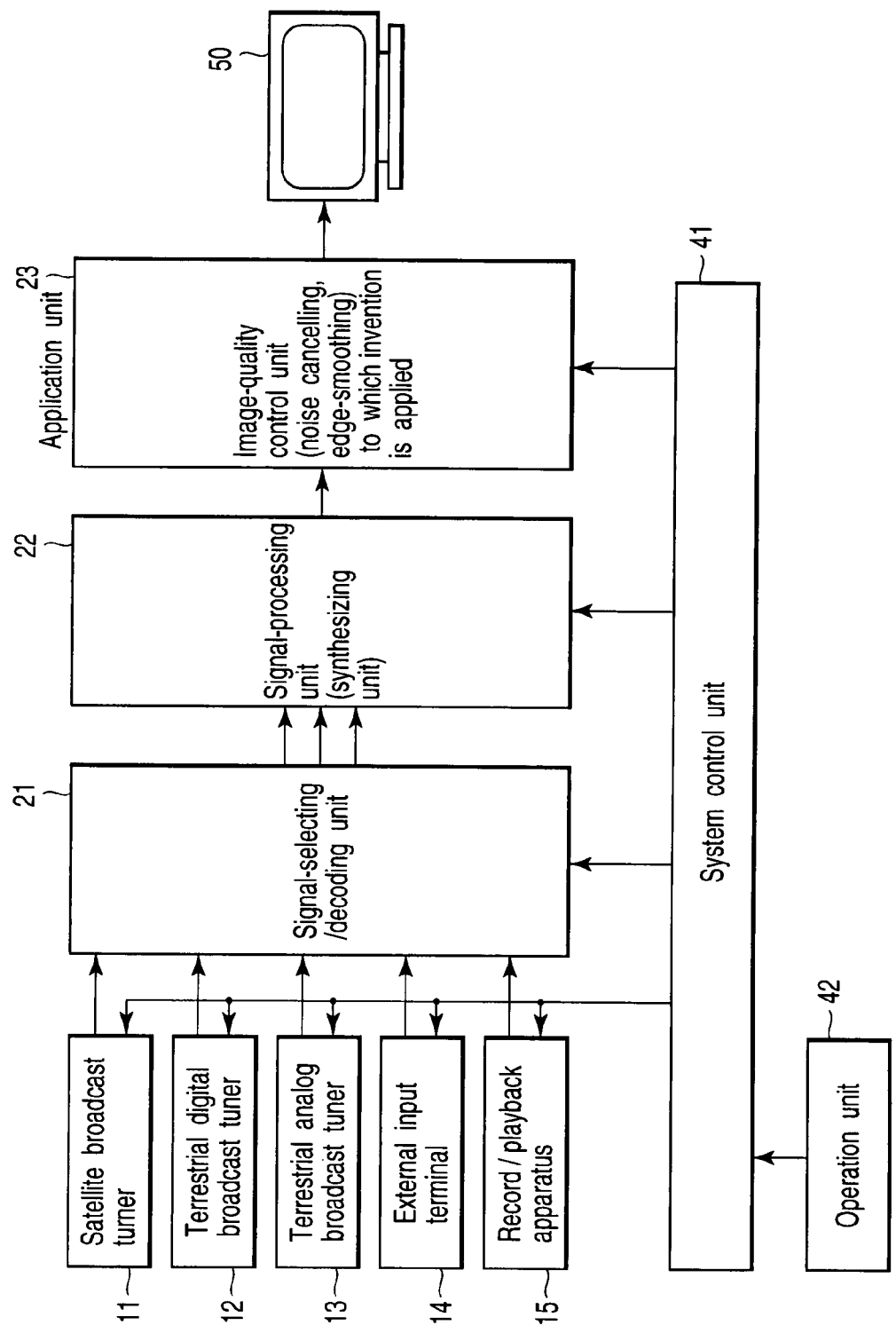
FIG. 7 is a diagram showing the overall configuration of a television receiver to which this invention is applied.

FIG. 7 is a block diagram showing the overall configuration of a television receiver. The television receiver has am image-quality control unit 23 to which this invention is applied. The image-quality control unit 23 performs edge-smoothing and noise-cancelling. The other components of the television receiver are designated by the same reference numbers, because they are identical to those described above.

Figure 8:
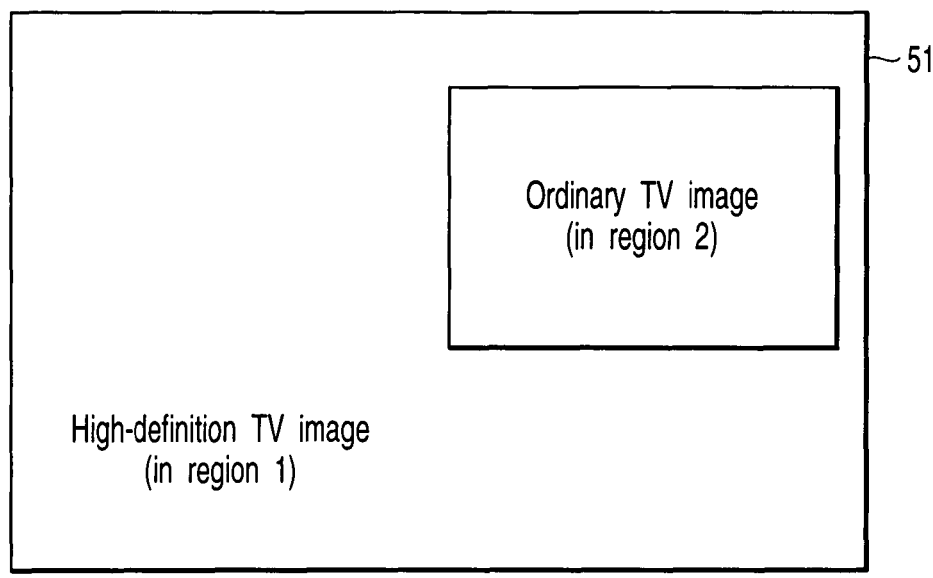
FIG. 8 is a diagram showing an exemplary screen of the television receiver to which this invention is applied.

FIG. 8 shows the screen of the display 51 displaying a synthesized image, which is composed of a high-definition TV image and an ordinary TV image displayed in regions 1 and 2, respectively. In this case, a video-data processing apparatus according to this invention can performs appropriate edge-smoothing in both the first region 1 and the second region 2.

The present invention is not limited to the embodiment described above. In the embodiment, edge-smoothing is performed on a synthesized video signal representing different images combined. Nonetheless, if the aspect ratio has been changed on the video signals that represent the different images, the edge-smoothing characteristic of the apparatus should be switched for the regions in which the images are displayed.

Figure 9:
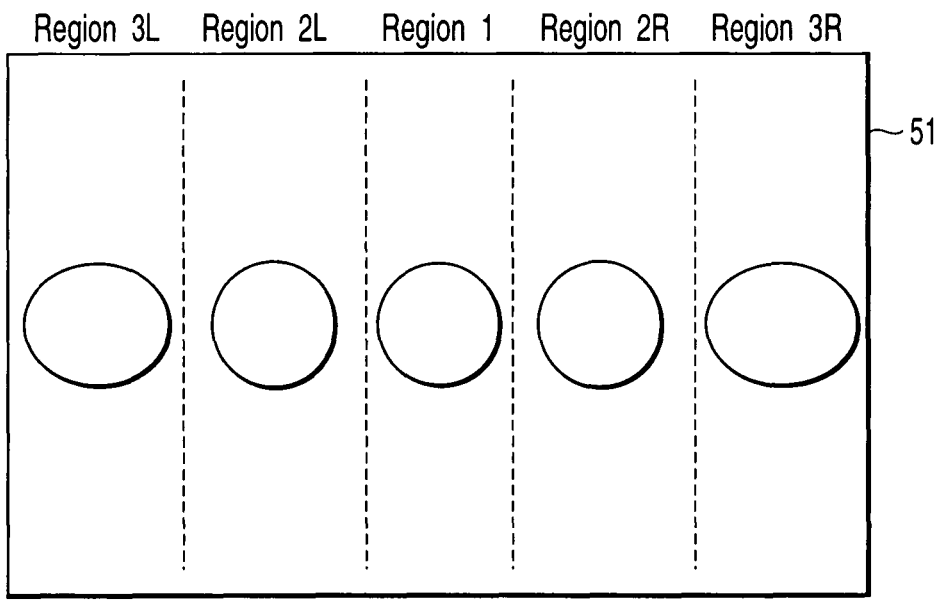
FIG. 9 is a diagram showing another exemplary screen of the television receiver to which this invention is applied.

FIG. 9 shows the screen of the display 51 displaying an image whose aspect ratio has been changed from, for example, 4:3 to 16:9. This change does not horizontally expand the image in the center region 1, and does horizontally expand the images in the regions on either side of the center region, more greatly in a region than in the region closer to the center region. More precisely, the images displayed in the regions 3L and 3R are horizontally more greatly expanded than the images displayed in the regions 2L and 2R. As a result, the aspect ratio of the synthesized image composed of the five images displayed in the regions 1, 2L, 2R, 3L and 3R has been changed from 4:3 to 16:9. In this case, too, it is of course desirable to switch the edge-smoothing characteristics for the regions 1, 2L, 2R, 3L and 3R. The edge-smoothing characteristics can be easily and appropriately switched only if parameters fit for these regions are prepared.

In the video-data processing apparatus, the processing of horizontal edges, the extraction of horizontal edge components, the processing of vertical edges, and the extraction of vertical edge components can be performed in any possible order.

In the embodiment described above, the freedom of edge-smoothing is high for the main synthesized video signal composed of video signals acquired from different sources, and the main synthesized video signal is processed in a single system. Therefore, the apparatus has a relatively small circuit size, is economical, and can readily be made into an integrated circuit.

While certain embodiments of the invention have been described, these embodiments have been presented by way of example only, and are not intended to limit the scope of the inventions. Indeed, the novel methods and systems described herein may be embodied in a variety of other forms; furthermore, various omission, substitutions and changes in the form of the methods and systems described herein may be without departing from the spirit of the inventions. The accompanying claims and their equivalents are intended to cover such forms or modifications as would fall within the scope and spirit of the inventions.

What is claimed is:

1. A video-data processing apparatus for achieving edge smoothing, comprising:

a synthesizing unit which synthesizes different images by allocating video data items representing the different images on a screen, thereby generating a main synthesized video signal;

a flag-inserting unit which inserts ID flags into the video data items, respectively, each ID flag identifying one video data item;

an image-edge processing unit which includes a plurality of delay circuits for delaying the main synthesized video signal, which outputs a reference synthesized video signal, and which selects and outputs a plurality of edge-smoothing synthesized video signals that precede and follow in phase the reference synthesized video signal, in accordance with an edge-processing control signal;

a flag decoder which discriminates the ID flags, and generates the edge-processing control signal to prevent the edge-smoothing synthesized video signals for the different images being processed together, and generates an edge-smoothing-parameter selecting signal in accordance with the ID flags; and an edge-component extracting unit which performs an operation on the reference synthesized video signal and the edge-smoothing synthesized video signals, thereby generating edge-smoothing components, and which adjusts the edge-smoothing components with the parameters based on the edge-smoothing-parameter selecting signal.

2. The apparatus according to claim 1, wherein the image-edge processing unit has,
a vertical-edge processing unit which has a plurality of line memories connected in series for delaying a synthesized video signal input, a delay circuit for extracting the reference synthesized video signal from any line memory, except the first and last ones of those connected in series,
line selectors of a first group, for receiving synthesized video signals delayed by units of lines with respect to the reference synthesized video signal and at least one synthesized video signal advanced by units of lines with respect to the reference synthesized video signal, and
line selectors of a second group, for receiving synthesized video signals advanced by units of lines with respect to the reference synthesized video signal and at least one synthesized video signal delayed by units of lines with respect to the reference synthesized video signal;
and the edge-processing control signal controls both the line selectors of the first group and the line selectors of the second group.

3. The apparatus according to claim 2, wherein the edge-component extracting unit has
a vertical-edge-component extracting unit which has a first line selector for receiving edge-smoothing synthesized video signals from the line sensors of the first group,
a second line selector for receiving edge-smoothing synthesized video signals from the line sensors of the second group,
a line multiplier for receiving the reference synthesized video signal,
a line adder for adding the first and second edge-smoothing synthesized video signals selected by the first and second line selectors and the reference synthesized video signal processed by the line multiplier, and
a line amplifier for amplifying an output of the line adder; the first and second line selectors are switched in terms of electing state by a vertical-filer-characteristic switching signal;
and eth line amplifier has a gain set by a parameter selected by the edge-smoothing-parameter selecting signal.

4. The apparatus according to claim 1, wherein the image-edge processing unit has
a horizontal-edge processing unit which has a plurality of delay elements connected in series for delaying the reference synthesized video signal in units of pixels,
a delay circuit for extracting the reference synthesized video signal from any delay element, except the first and last ones of those connected in series,
pixel selectors of a first group for receiving synthesized video signals delayed by units of pixels with respect to the reference synthesized video signal and at least one synthesized video signal advanced by units of pixels with respect to the reference synthesized video signal, and
pixel selectors of a second group for receiving synthesized video signals advanced by units of pixels with respect to the reference synthesized video signal and at least one synthesized video signal delayed by units of pixels with respect to the reference synthesized video signal;
and the edge-processing control signal controls both the pixel selectors of the first group and the pixel selectors of the second group.

5. The apparatus according to claim 4, wherein the edge-component extracting unit has
a horizontal-edge-component extracting unit which has a first pixel selector for receiving edge-smoothing synthesized video signals from the pixel sensors of the first group,
a second pixel selector for receiving edge-smoothing synthesized video signals from the pixel sensors of the second group,
a pixel multiplier for receiving the reference synthesized video signal,
a pixel adder for adding the first and second edge-smoothing synthesized video signals selected by the first and second pixel selectors and the reference synthesized video signal processed by the line multiplier, and
a pixel amplifier for amplifying an output of the pixel adder; the first and second pixel selectors are switched in terms of electing state by a horizontal-filter-characteristic switching signal;
and the pixel amplifier has a gain set by a parameter selected by the edge-smoothing-parameter selecting signal.

6. A method of processing video data comprising:
synthesizing different images in a synthesizing unit, by allocating video data items representing the different images on a screen, thereby generating a main synthesized video signal;
inserting ID flags into the video data items, respectively, in a flag-inserting unit, each ID flag identifying one video data item;
delaying the main synthesized video signal, in an image-edge processing unit, by a plurality of delay circuits for, outputting a reference synthesized video signal, and selecting and outputting a plurality of edge-smoothing synthesized video signals that precede and follow in phase the reference synthesized video signal, in accordance with an edge-processing control signal;
discriminating the ID flags identifying the video data items in a flag decoder, thereby generating the edge-processing control signal to prevent the edge-smoothing synthesized video signals for the different images, from being processed together, and generating an edge-smoothing-parameter selecting signal, in accordance with the ID flags; and
performing an operation on the reference synthesized video signal and the edge-smoothing synthesized video signals in an edge-component extracting unit, thereby generating edge-smoothing components and adjusting the edge-smoothing components with the parameters based on the edge-smoothing-parameter selecting signal.

* * * * *